Oct. 31, 1950     D. BLITZ     2,528,109
FREQUENCY MODULATION DISTANCE MEASURING SYSTEM
Filed March 28, 1946
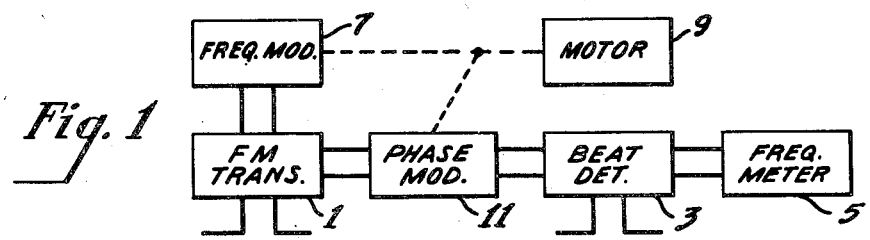
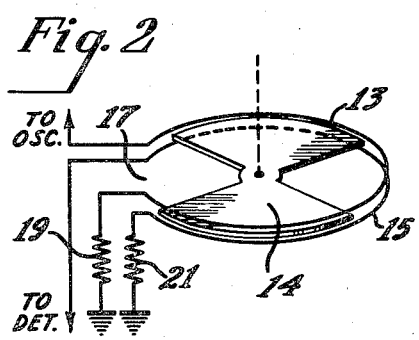
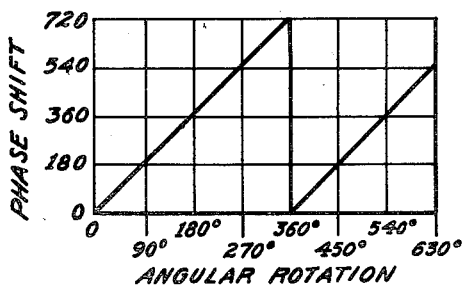
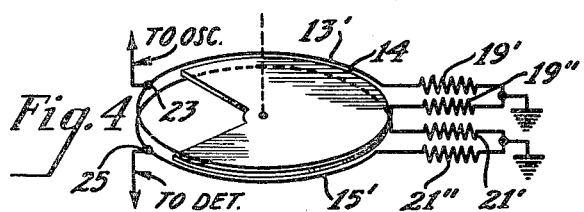
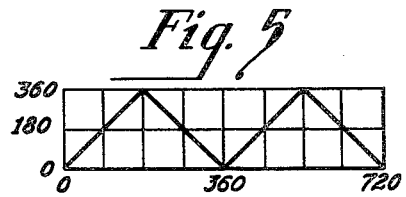
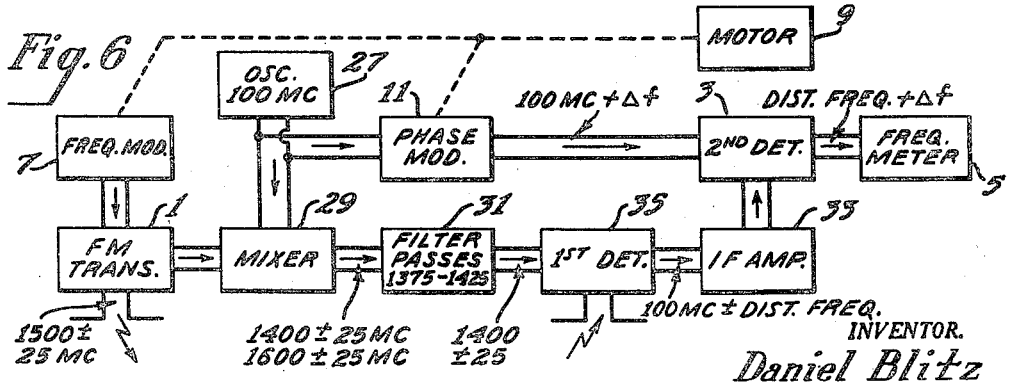
INVENTOR.
Daniel Blitz
BY
C. D. Cuska
ATTORNEY Patented Oct. 31, 1950

2,528,109

UNITED STATES PATENT OFFICE 2,528,109

FREQUENCY MODULATION DISTANCE MEASURING SYSTEM

Daniel Blitz, Princeton, N. J., assignor to Radio Corporation of America, a corporation of Delaware Application March 28, 1946, Serial No. 657,689

7 Claims. (Cl. 343—14)

This invention relates to radio distance measuring systems of the frequency modulation type, wherein a frequency modulated signal is radiated to an object whose distance is to be determined, received after reflection by said object, and mixed with the signal currently being transmitted to provide a beat signal. The frequency of the beat signal is the product of the distance and the rate of change of transmitter frequency, and thus is a direct measure of the distance.

In most frequency modulation radio distance measuring systems, the antennas are connected to the transmitter and receiver through transmission lines of substantial lengths. These lengths are in effect added to the true distance being measured, so that even when this distance is very small, or zero, the beat frequency is higher than the modulation frequency.

Certain applications require that the antennas be located very close to the transmitter and receiver apparatus, to provide a unitary structure capable of being mounted, for example in the wing of an airplane. When this is done, there is substantially no delay introduced by the connections to the antennas, and the minimum difference in frequency between the transmitted and received signals may be of the same order as, or less than the modulation frequency. If the transmitted signal is mixed directly with the received signal, the beat signals produced at short ranges cannot be separated from the modulation frequency components, and thus short distances cannot be measured. While this difficulty could be avoided by using long lines or delay networks between the antennas and the remainder of the equipment, such measures will add to the weight of the system as well as causing attenuation.

It is the principal object of the present invention to provide an improved method of and means for preventing, in a system of the described type, interference of modulation frequency components with the beat signal at minimum ranges.

Another object is to provide an improved method of and means for simulating the effects of relatively long transmission lines between the antennas and the transmitter and receiver.

A further object of the invention is to provide means for displacing the beat frequency by a predetermined amount, said means being capable of design to occupy a minimum of space and add little weight to the system.

The above and other objects will become apparent to those skilled in the art upon consideration of the following description, with reference to the accompanying drawing, wherein:

Figure 1 is a schematic block diagram of a radio altimeter system embodying the instant invention, Figure 2 is a schematic perspective diagram of a phase shifting device used in Figure 1, Figure 3 is a graph showing the characteristic of the device of Figure 2, Figure 4 shows a modification of the device of Figure 2, Figure 5 is a graph of the characteristic of the device of Figure 4, and Figure 6 is a schematic block diagram of a modification of the system of Figure 1.

Referring to Figure 1, a radio altimeter system is shown, including a transmitter 1, a beat detector 3, and a frequency meter 5. A frequency modulator 7 is connected to the transmitter 1 to vary cyclically its frequency of operation. The modulator 7 may be merely a variable capacitor, driven at substantially constant speed by a motor 9. For the purpose of illustration, it is assumed that the motor 9 runs at such a speed as to increase and decrease the frequency of the transmitter sawtooth fashion at a modulation frequency $f_m$ of 100 cycles per second.

In prior art practice, the transmitter 1 would be coupled directly to the detector 3 to provide a signal for beating with the received signals. In the present case, however, a phase modulator 11 is included in the connection between the transmitter and the beat detector. The modulator 11 may be of the type described and claimed in co-pending U. S. patent application Serial No. 516,254, filed December 30, 1943, by Royden C. Sanders, Jr. et al. and entitled Phase Modulators, now Patent No. 2,409,449, issued October 15, 1946, or any other known device for cyclically varying the phase of the beating signal at a uniform rate through exactly 360 degrees, or an exact multiple thereof. The phase modulator 11, like the frequency modulator 7, is driven by the motor 9, but not necessarily at the same speed. For example, the modulator 11 may cyclically shift the phase of the injection signal through 360 degrees 200 times every second. The phase modulation frequency $f_p$ is 200 cycles per second.

Referring to Figure 2, the phase modulator 11 comprises a pair of parallel conductors 13 and 15 formed in concentric circles, with a small gap at the point 17, and with a rotatable vane or shutter 14 disposed between them. The perimeter of the circle of each conductor is an exact number of half wavelengths long. One end of the conductor 13 is connected to the transmitter 1, and the corresponding end of the conductor 15 is connected to the beat detector 3. The other ends of the conductors 13 and 15 are grounded through load resistors 19 and 21, which match the line impedance and prevent the formation of standing waves.

The vane 14 shields the conductors 13 and 15 from each other over a part of their peripheries, and allows coupling between them over the remainder. While this coupling is distributed throughout a considerable portion of the lengths of the two conductors, its resultant is the same as if it were at a single point. Rotation of the vane moves this point. Thus the total path length through the modulator will vary by twice the circumference of the circular loops formed by the conductors 13 and 15 with each complete revolution of the vane 14. Since this circumference is an even number of half wavelengths, there is no abrupt change in phase as the resultant coupling point passes the gap 17.

Suppose the loop circumference to be one wavelength. Each revolution of the vane 14 changes the phase between the input from the transmitter 1 and the output to the detector 3 by 720 degrees, or two complete cycles. As shown in Figure 3, the phase shift varies uniformly with rotation from zero to 720 degrees, then starts over at zero. Since there is no difference between a wave shifted 720 degrees and the same wave with no phase shift, the effect is the same as if the phase were shifting constantly at the uniform rate of 720 degrees per revolution. If the speed of rotation is 100 revolutions per second, the output will be 200 cycles per second higher or lower in frequency than the input, depending upon the direction of rotation.

Returning to Figure 1, the operation is as follows: The transmitter 1 provides an output having an average frequency of, for example, 400 megacycles per second, varying from 398 to 402 megacycles at the modulation frequency, 100 cycles per second. This signal is radiated, reflected by the surface, and picked up at the detector 3. The frequency of the received signal at any instant differs from that of the transmitted signal by an amount:

$$f_d = \frac{df}{dt} \cdot t$$

where $$\frac{df}{dt}$$

is the rate of change of the transmitter frequency and $t$ is the time required for the signal to travel to the surface and return. In the present illustration, $$\frac{df}{dt}$$

is 400 megacycles per second per second. The time $t$ is proportional to the distance being measured.

Ordinarily, the difference frequency $f_d$ is produced by mixing the transmitted and received signals in the beat detector 3. In the system of Figure 1, the mixing signal from the transmitter is raised 200 cycles per second by the above described action of the phase modulator 11. Thus the beat frequency output of the detector 3 is not $f_d$, but is $f_d + 200$. Thus even at minimum altitude where $f_d$ is nearly zero, the beat frequency is at least 200 cycles per second and is substantially higher than the modulation frequency $f_m$. The frequency meter 5 is designed so as not to respond to frequencies lower than the minimum beat frequency and therefore is unaffected by modulation frequency components.

In the above description, it has been assumed that the frequency modulation of the transmitter 1 is sawtooth fashion, increasing during most of the modulation cycle and then suddenly decreasing to its original value during a negligibly short interval at the end of each cycle, so that the difference $f_d$ at any particular altitude remains constant substantially throughout each modulation cycle.

In some systems it is preferable to use symmetrical modulation, with the frequency increasing during half the modulation cycle and decreasing during the other half. With such systems, the transmitter frequency is lower than the received frequency during increase of transmitter frequency, and higher than the received frequency during decrease of transmitter frequency. To practice the present invention, the injection signal must be raised in frequency during one half the modulation cycle and lowered in frequency during the other half.

Referring to Figure 4, the above requirement for symmetrical modulation is met by a modification of the structure of Figure 2, comprising parallel lines 13' and 15' each extending both ways from the input terminal 23 and the output terminal 25 respectively. Both ends of each line terminate adjacent each other in load resistors 19' and 19" and 21' and 21" respectively. The vane 14' is provided with but one coupling gap instead of two. The structure of Figure 4 operates like that of Figure 1 except that it advances the phase during one half of each revolution and retards the phase during the other half, as shown by the graph of Figure 5. The shaft of the phase modulator must be positioned with respect to that of the frequency modulator 7 to provide increase and decrease in the frequency of the injection signal at the proper times.

Referring to Figure 6, the invention may be applied to a distance measuring system of the superheterodyne type, including, in addition to the elements shown in Figure 1, a local oscillator 27, mixer 29, a side band filter 31, intermediate frequency amplifier 33, and a first detector 35. The beat detector 3 acts as a second detector, and receives its injection signal through the phase modulator 11 from the local oscillator 27.

In the system of Figure 6, the transmitter 1 may operate at a mean frequency of 1500 megacycles, and be varied over a range of ±25 megacycles by the modulator 7. The oscillator 27 operates at a much lower frequency, say 100 megacycles. The mixer 29 modulates some of the transmitter output with that of the oscillator 27, providing an output which includes a 1400 megacycle signal, frequency modulated ±25 megacycles like the transmitter output, and a 1600 megacycle signal, also frequency modulated.

The filter 31 excludes everything but the lower side band, 1375 to 1425 megacycles. This is combined in the detector 35 with the received 1500 megacycle frequency modulated signal, producing an output of 100 megacycles alternately plus and minus the distance frequency of $f_d$. The modulated 100 megacycle signal is amplified by the amplifier 33 and applied to the second detector 3, together with the approximately 100 megacycle output of the phase modulator 11.

Assuming that the phase modulation frequency $f_p$ is 200 cycles per second, as in the system of Figure 1, the output of the phase modulator to the detector 3 is 100 megacycles plus 200 cycles per second. The output of the detector 3 will then be $f_d+200$ cycles, as in the system of Figure 1.

Thus the invention has been described as an improvement in radio distance measuring systems of the frequency modulation type, whereby the beat signal which is measured to indicate distance is always higher than the modulation frequency. This is accomplished by continuously shifting the phase of the direct, or injection signal at such a rate as to raise the beat frequency by an amount greater than the rate of frequency modulation.

I claim as my invention:

1. A radio distance measuring system including a transmitter, frequency modulator means cyclically varying or sweeping the frequency of said transmitter at a frequency $f_m$, means for radiating a signal comprising a portion of the output of said transmitter toward a reflecting object whose distance is to be determined, means for receiving said signal after reflection by said object, a heterodyne detector, means for applying said received signal to said detector, a variable phase shifter, means for applying a further portion of said transmitter output through said phase shifter to said detector, means operating said phase shifter to cyclically vary, at a uniform rate and at a frequency greater than $f_m$, the phase of said further portion of said transmitter output and to continuously shift the phase of said further portion of the output in only one direction during the entire frequency modulation sweep in one direction, and means responsive to the output of said detector to indicate the frequency thereof.

2. A radio distance measuring system including a transmitter, frequency modulator means cyclically varying or sweeping the frequency of said transmitter, means for radiating a signal comprising a portion of the output of said transmitter toward a reflecting object whose distance is to be determined, means for receiving said signal after reflection by said object, a heterodyne detector, means for applying said received signal to said detector, a variable phase shifter, means for applying a further portion of said transmitter output through said phase shifter to said detector, means operating said phase shifter to cyclically vary at a uniform rate the phase of said further portion of said transmitter output through an angle which is an integral multiple of 360 degrees and to continuously shift the phase of said further portion of the output in only one direction during the entire frequency modulation sweep in one direction, and means responsive to the output of said detector to indicate the frequency thereof.

3. A radio distance measuring system of the frequency modulation type, including means for transmitting frequency modulated signals to a reflecting object and means for receiving said signals after reflection by said object, said receiver means including a heterodyne detector, means for applying a portion of the output of said transmitter means to said detector, said last mentioned means including means shifting the phase of said portion of transmitter output at a uniform rate of at least 360 degrees during each modulation cycle and also shifting the phase of said portion of the output in only one direction during the entire frequency modulation sweep in one direction, and frequency responsive indicator means connected to said detector.

4. A radio distance measuring system of the frequency modulation type, including means for transmitting signals frequency modulated at a rate $f_m$ to a reflecting object and means for receiving said signals after reflection by said object, said receiver means including a heterodyne detector, means for applying a portion of the output of said transmitter means to said detector, said last mentioned means including means changing the frequency of said portion of said transmitter output by a predetermined fixed amount greater than $f_m$ during the entire frequency modulation sweep in one direction, and frequency responsive indicator means connected to said detector.

5. A radio distance measuring system including a transmitter, frequency modulator means connected to said transmitter to cyclically vary or sweep the frequency of operation thereof at a frequency $f_m$, radio receiver means including a heterodyne detector, a phase modulator, means for applying an injection signal from said transmitter through said phase modulator to said detector, and means for operating said phase modulator to cyclically vary the phase of said injection signal through an angle which is an integral multiple of 360 degrees and at a frequency $f_p$, greater than $f_m$, and to continuously shift the phase of said injection signal in only one direction during the entire frequency modulation sweep in one direction, whereby said injection signal differs in instantaneous frequency from the output of said transmitter by the amount $f_p$ and the frequency of the output of said detector is always greater than $f_m$.

6. A radio distance measuring system including a transmitter, a frequency modulator connected to said transmitter to vary cyclically the frequency of operation thereof at a frequency $f_m$, a mixer connected to said transmitter and a local oscillator connected to said mixer to provide an injection signal of intermediate frequency and frequency modulated like the output of said transmitter, a receiver including a first detector, means for applying said injection signal to said first detector to provide output of a frequency differing from that of said local oscillator by an amount $f_d$ substantially proportional to the distance being measured, a second detector, and means for applying the output of said first detector to said second detector; means for applying a signal from said local oscillator to said second detector, said means including a frequency changer for raising the frequency of said last mentioned signal by a constant amount greater than $f_m$, and beat frequency responsive indicator means connected to said second detector.

7. The invention set forth in claim 6, wherein said frequency changer comprises a phase modulator and means operating said phase modulator to cyclically vary the phase of said signal from said local oscillator through an angle which is an integral multiple of 360 degrees.

DANIEL BLITZ.

REFERENCES CITED

The following references are of record in the file of this patent:

UNITED STATES PATENTS

| Number | Name | Date |
|---|---|---|
| 2,050,418 | Boerner | Aug. 11, 1936 |
| 2,222,587 | Sanders | Nov. 19, 1940 |
| 2,234,329 | Wolff | Mar. 11, 1941 |
| 2,421,394 | Schelleng | June 3, 1947 |
| 2,453,169 | Varian | Nov. 9, 1948 |